US012742920B2

(12) United States Patent
Lee et al.

(10) Patent No.: US 12,742,920 B2
(45) Date of Patent: Sep. 22, 2026

(54) BACKLIGHT UNIT AND DISPLAY DEVICE

(71) Applicant: LG ELECTRONICS INC., Seoul (KR)

(72) Inventors: Byungwoo Lee, Seoul (KR); Woongjoon Hwang, Seoul (KR); Jihye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/268,351

(22) Filed: Jul. 14, 2025

(65) Prior Publication Data

US 2026/0133356 A1 May 14, 2026

(30) Foreign Application Priority Data

Nov. 13, 2024 (WO) ................ PCT/KR2024/096490

(51) Int. Cl.
*F21V 8/00* (2006.01)

(52) U.S. Cl.
CPC .................................. *G02B 6/0031* (2013.01)

(58) Field of Classification Search
CPC ............. G02B 6/0031; G02F 1/133605; G02F 1/133615
See application file for complete search history.

(56) References Cited

U.S. PATENT DOCUMENTS

2006/0256254 A1* 11/2006 Park .................. G02F 1/133615 349/65

FOREIGN PATENT DOCUMENTS

| | | | | |
|---|---|---|---|---|
| JP | 2017-91892 A | 5/2017 | | |
| KR | 10-2008-0099039 A | 11/2008 | | |
| KR | 10-2011-0051390 A | 5/2011 | | |
| KR | 10-2011-0054783 A | 5/2011 | | |
| KR | 10-2012-0048676 A | 5/2012 | | |
| KR | 20130126271 A | * | 11/2013 | ............... F21K 9/61 |
| KR | 20140047854 A | * | 4/2014 | ........... G02B 6/0021 |
| WO | WO-2013161945 A1 | * | 10/2013 | ........... G02B 6/0081 |

* cited by examiner

*Primary Examiner* — Anabel Ton

(74) *Attorney, Agent, or Firm* — Birch, Stewart, Kolasch & Birch, LLP

(57) ABSTRACT

The present disclosure provides backlight unit. The backlight unit includes: a light assembly; a light guide plate including an incident light surface facing the light assembly on a side surface and an emission surface located on a front surface; an optical sheet configured to uniformly emit light emitted from the light guide plate toward a front side; and a reflective sheet located on a rear surface of the light guide plate. A center of the incident light surface is spaced by a first distance from the light assembly in a thickness direction of the incident light surface. Front and rear ends of the incident light surface are spaced by a second distance from the light assembly. The incident light surface has a curved surface where the first distance is longer than the second distance.

6 Claims, 8 Drawing Sheets

BACKLIGHT UNIT AND DISPLAY DEVICE

This application claims the benefit of PCT Patent Application No. PCT/KR 2024/096490, filed on Nov. 13, 2024, which is hereby incorporated by reference as if fully set forth herein.

BACKGROUND

Technical Field

The present disclosure relates to a backlight unit with improved reliability and optical efficiency and display device including the same.

Discussion of the Related Art

With the advancement of the information society, the demand for display devices has been increasing in various forms. In response, recent display devices include liquid crystal displays (LCDs), field emission displays (FEDs), plasma display panels (PDPs), and Electroluminescence Devices.

The liquid crystal panel of a liquid crystal display device includes a liquid crystal layer, a thin-film transistor (TFT) substrate, and a color filter substrate, where the TFT substrate and color filter substrate face each other across the liquid crystal layer. The liquid crystal panel may display an image using light provided by a backlight unit.

Active matrix-type organic light-emitting display devices, which are an example of electroluminescence devices, are commercially available. Since organic light-emitting display devices are self-emissive, the organic light-emitting display devices do not require a backlight, unlike liquid crystal display devices. The organic light-emitting display devices are gaining attention as next-generation displays because the organic light-emitting display devices have advantages in response times, viewing angles, and other aspects.

However, due to the price competitiveness of organic light-emitting displays (OLEDs), efforts are being made to improve the image quality of liquid crystal display devices in order to provide display devices with quality close to that of OLEDs.

The liquid crystal display device includes a backlight unit that supplies light from the rear, and the backlight unit may be divided into direct-type and edge-type based on the arrangement of a light source. In the direct-type, a light assembly is positioned on the back of a display to supply light toward the front from the back of the display, while in the edge-type, a light assembly is positioned on the side of a display to supply light toward the front from the side of the display.

The edge-type allows for a slim design and has the advantage of lower manufacturing costs due to a small number of light assemblies. However, since the light is supplied from one side of a light guide plate toward the front, brightness differences between the edges and the center may occur, leading to a decrease in brightness uniformity.

SUMMARY

Accordingly, the present disclosure is directed to a backlight unit and display device that substantially obviate one or more problems due to limitations and disadvantages of the related art.

An object of the present disclosure is to provide an edge-type backlight unit capable of supplying light uniformly and improving optical efficiency and display device including the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a backlight unit includes: a light assembly; a light guide plate including an incident light surface facing the light assembly on a side surface and an emission surface located on a front surface; an optical sheet configured to uniformly emit light emitted from the light guide plate toward a front side; and a reflective sheet located on a rear surface of the light guide plate. A center of the incident light surface is spaced by a first distance from the light assembly in a thickness direction of the incident light surface. Front and rear ends of the incident light surface are spaced by a second distance from the light assembly. The incident light surface has a curved surface where the first distance is longer than the second distance.

The first distance may be between 1.3 times and 2.1 times the second distance.

The incident light surface may include a curved surface perpendicular to the light emitted from the light assembly.

The backlight unit may further include an uneven pattern including multiple protrusions formed on the rear surface of the light guide plate. Diameters of the protrusions increase as the protrusions are spaced farther from the light assembly.

A diameter of a protrusion adjacent to the light assembly may be smaller than or equal to half a spacing to an adjacent protrusion.

In another aspect of the present disclosure, provided herein is a display device. The display device includes: a display panel; and a backlight unit located on a rear surface of the display panel and configured to supply light to the display panel. The backlight unit includes: a light assembly; a light guide plate including an incident light surface facing the light assembly on a side surface and an emission surface located on a front surface; an optical sheet configured to uniformly emit light emitted from the light guide plate toward a front side; and a reflective sheet located on a rear surface of the light guide plate. A center of the incident light surface is spaced by a first distance from the light assembly in a thickness direction of the incident light surface. Front and rear ends of the incident light surface are spaced by a second distance from the light assembly. The incident light surface has a curved surface where the first distance is longer than the second distance.

It is to be understood that both the foregoing general description and the following detailed description of the present disclosure are exemplary and explanatory and are intended to provide further explanation of the disclosure as claimed.

As is apparent from the above description, the present disclosure has effects as follows.

A backlight unit according to the present disclosure may improve the reliability of a light guide plate by increasing the distance from a light source to the incident light surface of the light guide plate.

The optical efficiency may be improved by preventing light loss at the incident light surface of the light guide plate due to Fresnel reflection.

According to the present disclosure, uneven pattern having multiple protrusions formed on the rear surface of the light guide plate may be further included. The diameter of the protrusion may increase as the protrusion is spaced farther from a light assembly. —

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
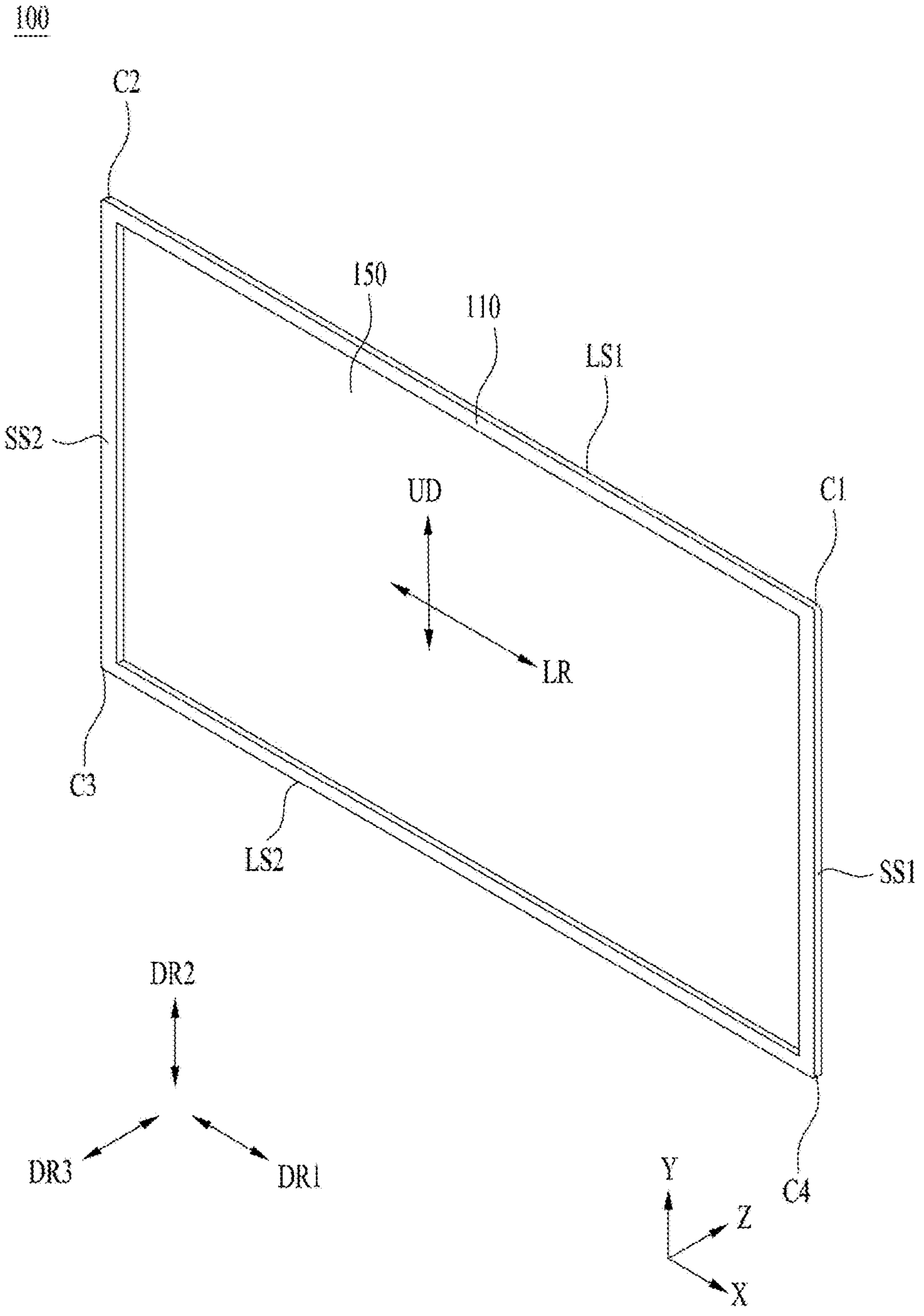
FIG. 1 is a perspective view illustrating an example of a display device of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions, or steps, disclosed in the specification, and it is also understood that greater or fewer components, functions, or steps may likewise be utilized.

Meanwhile, an image display device 100 described in this specification is, for example, an intelligent image display device 100 having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a front perspective diagram illustrating an example of a display device of the present disclosure. A display device 100 of the present disclosure may have a rectangular main body including a pair of long sides and a pair of short sides. It may include a first long side LS1, a second long side LS2 facing the first long side LS1, a first short side SS1 adjacent to the first long side LS1 and the second long side LS2, and a second short side SS2 facing the first short side SS1.

A long side extending in a horizontal direction and a short side extending in a vertical direction are illustrated in the drawing, but the long side and the short side may have the same length, and the long side may be disposed in the vertical direction.

For convenience of explanation, the following description is made based on an embodiment in which a side extending in the horizontal direction (i.e., x-axis direction) and a side extending in the vertical direction (i.e., y-axis direction) are referred to as a long side and a short side, respectively, but the present disclosure is not limited thereto.

A first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The side of the display device 100 on which a picture is displayed may be referred to as a front side or a front surface. When the display device 100 displays the picture, the side of the display device 100 from which the picture cannot be viewed may be referred to as a rear side or a rear surface.

When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

The display device may include a display unit 120 configured to output an image. A driving signal may be generated by converting an image signal, a data signal, an OSD signal, a control signal, or the like received from the interface unit, which are processed by the controller 180. The display unit 150 may include a display panel including a plurality of pixels.

Each of the plurality of pixels in the display panel may include RGB subpixels. Alternatively, each of the plurality of pixels in the display panel may include RGBW subpixels. The display module 151 may convert an image signal, a data signal, an OSD signal, and a control signal processed by the controller 180 to generate a driving signal for the plurality of pixels.

The display device 100 includes a display unit 120 that occupies most of a front area and a case that covers a rear side, a lateral side, and the like of the display unit 120 and packages the display unit 120.

The display unit 150 may be a Plasma Display Panel (PDP), a Liquid Crystal Display (LCD), an Organic Light Emitting Diode (OLED), a flexible display, or the like, and may also be a 3D display. The 3D display unit 150 may be classified into a glasses-free type or a glasses type.

An LCD display is supplied with light through a backlight unit because it is difficult to emit light by itself. The backlight unit is a device that uniformly supplies light supplied from a light-emitting lamp to liquid crystals located on a front surface. As the backlight unit becomes thinner and thinner, a thin LCD can be implemented.

Figure 2:
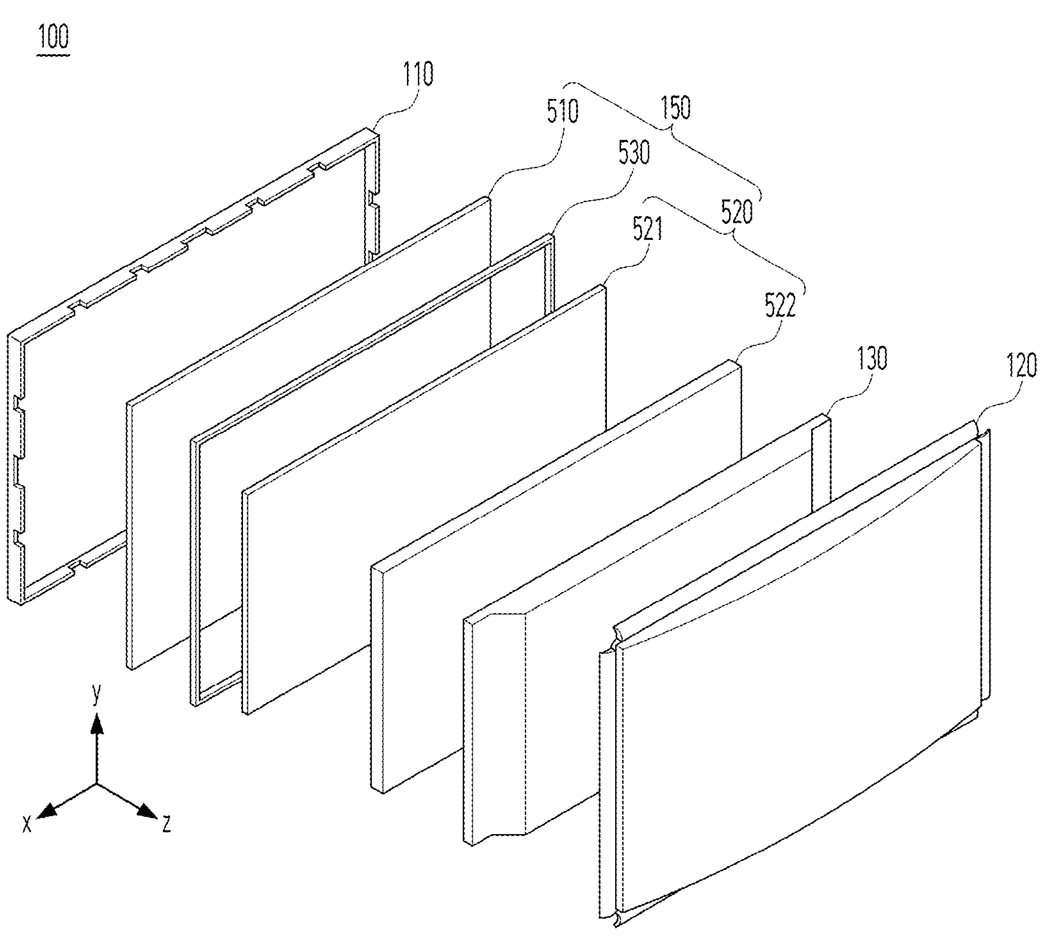
FIG. 2 is an exploded perspective view illustrating an example of the display device of the present disclosure.

FIG. 2 is an exploded diagram illustrating a display device of the present disclosure. Referring to FIG. 2, a display unit 120 of the present disclosure is an LCD display including a display panel 510 and a backlight unit 520.

A front cover 110 may cover at least a portion of a front surface and a side surface of the display panel 510. The front cover 110 may be divided into a front cover positioned on a side of the front surface of the display panel 510 and a side cover positioned on a side of the side surface of the display panel 510. The front cover and the side cover may be separately configured. One of the front cover and the side cover may be omitted.

The display panel 510 is provided to a front surface of the display device 100 to display an image. The display panel 510 may display an image by allowing a plurality of pixels to output Red, Green, or Blue (RGB) per pixel according to a timing. The display panel 510 may be divided into an active area in which an image is displayed and a de-active area in which an image is not displayed. The display panel 510 may include a front substrate and a rear substrate facing each other with a liquid crystal layer interposed therebetween.

The front substrate may include a plurality of pixels consisting of Red (R), Green (G), and Blue (B) subpixels. The front substrate may output light corresponding to a color of red, green, or blue according to a control signal.

The rear substrate may include switching elements. The rear substrate may switch pixel electrodes. For example, the pixel electrode may change molecular arrangement of a liquid crystal layer according to a control signal applied from the outside. The liquid crystal layer may include liquid crystal molecules. The liquid crystal molecules may change the arrangement based on a voltage difference generated between a pixel electrode and a common electrode. The liquid crystal layer may transmit the light provided from the backlight unit 520 to the front substrate or block the light.

The backlight unit 520 may be located behind the display panel 510. The backlight unit 520 may include light sources. The backlight unit 520 may be coupled to a front side of a frame 130.

The backlight unit 520 may be driven in a full driving mechanism or a partial driving mechanism such as local dimming or impulsive. The backlight unit 520 may include an optical sheet 521 and an optical layer 522.

A guide panel 530 for aligning the positions of the display panel 510 and the backlight unit 520 may be included. The guide panel 530 has a frame shape having four sides, and the display panel 510 and the backlight unit 520 may be seated on a front surface.

The optical sheet 521 may allow light from a light assembly 524 to be evenly transmitted to the display panel 510. The optical sheet 521 may be composed of layers. For example, the optical sheet 521 may include a prism sheet, a diffusion sheet, and the like.

The optical sheet 521 may include a coupling part. The coupling part may be coupled to the front cover 110, the frame 130, and/or the back cover 120. Alternatively, the coupling part may be coupled to a structure formed/coupled on/to the front cover 110, the frame 130, and/or the back cover 120.

The frame 130 may serve to support components of the display device 100. For example, a configuration such as the backlight unit 520 may be coupled to the frame 130. The frame 130 may be made of a metal material such as an aluminum alloy, etc.

The back cover 120 may be located on or behind a rear surface of the display device 100. The back cover 120 may be coupled to the frame 130 and/or the front cover 110. For example, the back cover 120 may be an injection molding product made of a resin material.

Figure 3:
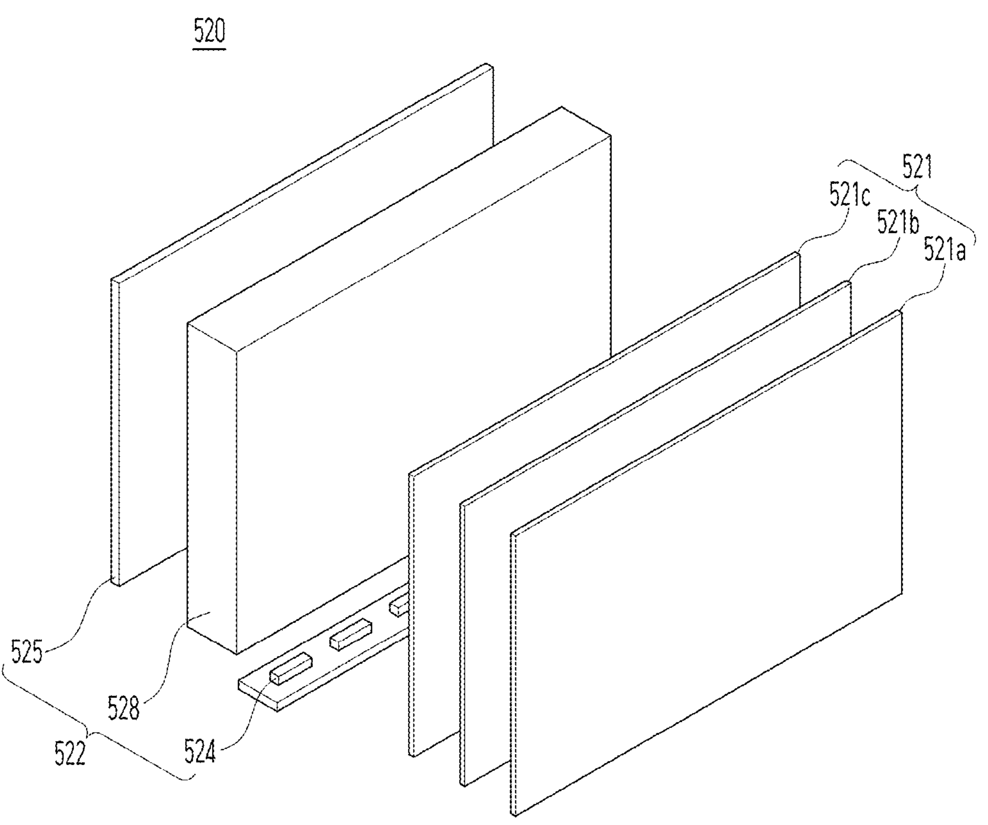
FIG. 3 is a view illustrating an embodiment of a backlight unit of the display device.
Figure 4:
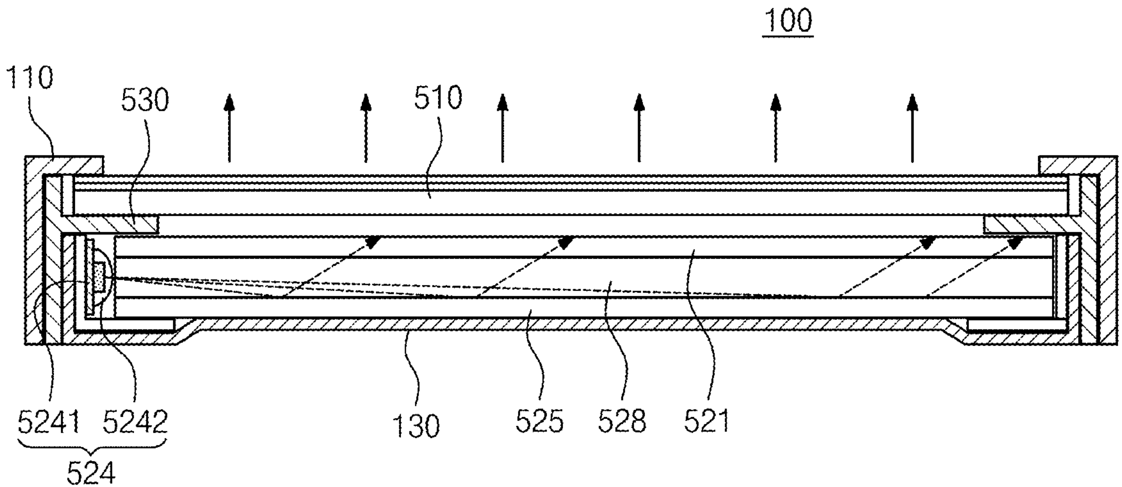
FIG. 4 is a side cross-sectional view of the backlight unit of the display device of the present disclosure.

FIG. 3 is an exploded perspective view illustrating another embodiment of a backlight unit 520 of the display device 100, and FIG. 4 is a cross-sectional view illustrating one embodiment of a backlight unit 520 of a display device 100. The backlight unit 520 of the present embodiment is an edge-type backlight unit 520 in which a light assembly 524 exists only in a lateral direction.

The light assembly 524 may be positioned on multiple sides of a light guide plate 528, but is generally positioned adjacent to one side of the light guide plate 528 in a first direction D1. The light assembly 524 extends in a second direction D2, which is perpendicular to the first direction D1. The light assembly 524 may have a length that matches the length of the second direction D2 on one side of the light guide plate 528 in the first direction D1.

A substrate 5241 may be located on at least one side of another configuration of an optical layer 522. Light-emitting lamps 5242 or optical assemblies 524 may be mounted on the substrate 5241. An electrode pattern for connecting an adapter and the light-emitting lamp 5242 may be formed on the substrate 5241. For example, a carbon nanotube electrode pattern for connecting the light-emitting lamp 5242 to the adapter may be formed on the substrate 5241. For example, the substrate 5241 may be a Printed Circuit Board (PCB).

The light-emitting lamps 5242 may be disposed on the substrate 5241 at a predetermined interval. The light-emitting lamp 5242 may be smaller than a thickness of a light guide plate 528. Therefore, most of the light provided by the light-emitting lamp 5242 may be transmitted to the light guide plate 528.

The light-emitting lamp 5242 may be a Light Emitting Diode (LED) chip or a light-emitting diode package including at least one light-emitting diode chip. The light-emitting lamp 5242 may be composed of a colored LED or a white LED that emits at least one color among colors such as red, blue, and green.

A light source included in the light-emitting lamp 5242 may be a Chip On Board (COB) type. The COB type may be a type in which an LED chip, which is a light source, is directly coupled to the substrate 5241. Therefore, a process may be simplified. In addition, resistance may be lowered, and thus energy lost to heat may be reduced. That is, it means that power efficiency of the light-emitting lamp 5242 may be increased. The COB type may provide brighter lighting. The COB type may be implemented thinner and lighter than the related art.

The light guide plate 528 is an optical structure that guides light from the light-emitting lamp 5242 incident on one side of the light guide plate 528 in the first direction D1 to spread widely and emit light in the front direction of the light guide plate 528.

A reflective sheet 525 may be positioned behind the light guide plate 528. The reflective sheet 525 may reflect light provided from the light-emitting lamp 5242. The reflective sheet 525 may reflect light introduced from the light guide plate 528 back to the front of the light guide plate 528.

The reflective sheet 525 may include at least one of a metal and a metal oxide that are reflective materials. For example, the reflective sheet 525 may include a metal and/or a metal oxide having high reflectivity, such as at least one of aluminum (Al), silver (Ag), gold (Au), and titanium dioxide (TiO2).

The reflective sheet 525 may be formed by depositing and/or coating a metal or a metal oxide. The reflective sheet 525 may be printed with ink containing a metal material. The reflective sheet 525 may have a deposition layer using vacuum deposition such as thermal deposition, evaporation, or sputtering. The reflective sheet 525 may have a coating layer and/or a printing layer formed by printing, gravure coating, or silk screen.

The reflective sheet 525 reflects light at an angle equal to the angle of incidence with respect to the normal. Therefore, light reflected by the reflective sheet 525 may be emitted from the front of the light guide plate 528, but the light may also be reflected again and transmitted to the other side of the light guide plate 528.

In the edge type, some of the light located on one side of the light guide plate 528 may be emitted forward from the light guide plate 528, while another portion may move to the other side of the light guide plate 528 and may be emitted forward from the other side of the light guide plate 528.

The rear surface of the light guide plate 528 may include an uneven pattern 5283 (FIG. 8) with multiple protrusions that change the reflection angle to direct light toward the front, rather than reflecting the light at the same angle as the incident angle. The light reflected from the uneven pattern 5283 on the rear surface of the light guide plate 528 may be emitted toward the front of the light guide plate 528.

A diffusion plate (not shown) may be further included on a front surface of the light guide plate 528. The diffusion plate may diffuse light emitted from the light guide plate 528 forward.

An air gap may be positioned between the light guide plate 528 and the optical sheet 521. The air gap may disperse light emitted from the light-emitting lamp 5242. Meanwhile, a resin 5243 (see FIG. 6) may be deposited on the light-emitting lamp 5242 and/or the reflective sheet 525. The resin 5243 may diffuse light provided from the light-emitting lamp 5242.

The optical sheet 521 may be located in front of the light guide plate 528. A rear surface of the optical sheet 521 may face the light guide plate 528, and a front surface of the optical sheet 521 may face a rear surface of the display panel 510.

The optical sheet 521 may include at least one sheet. The optical sheet 521 may include one or more prism sheets and/or one or more diffusion sheets. A plurality of the sheets included in the optical sheet 521 may be in an attached state and/or a close contact state.

For example, the optical sheet 521 may include first to third optical sheets 521*a* to 521*c*. The first optical sheet 521*a* may be a diffusion sheet, and the second and third optical sheets 521*b* and 521*c* may be prism sheets. The number and/or positions of the diffusion and prism sheets may be changed.

The diffusion sheet 521*a* may prevent the light emitted from the light guide plate 528 from being partially concentrated, thereby making the distribution of light uniform. The prism sheets 521*b* and 521*c* may condense the light emitted from the diffusion sheet 521*a* and provide the light toward the display panel 510.

Figure 5:
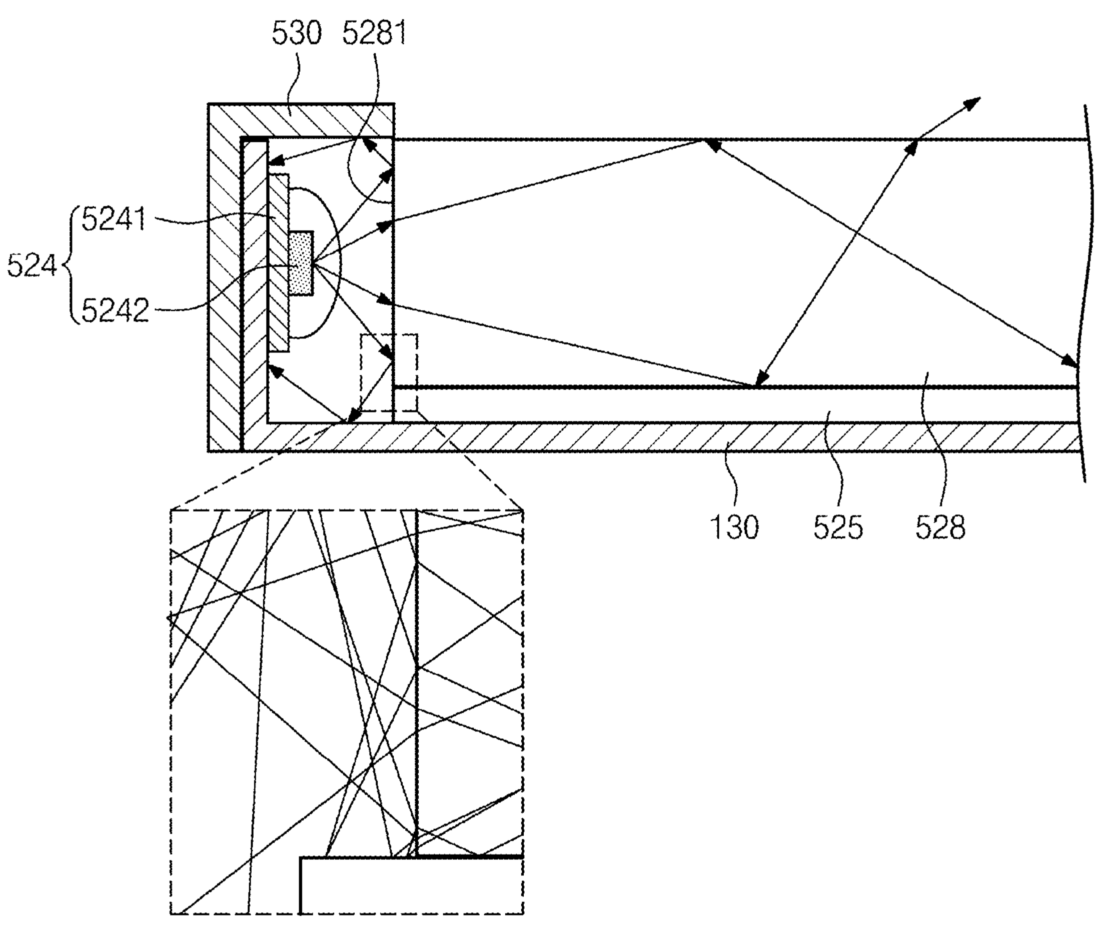
FIG. 5 is a side cross-sectional view of a backlight unit of a conventional display device.

FIG. 5 is a side cross-sectional view of a backlight unit 520 of a conventional display device 100. In FIG. 5, the upper side represents the front, and the lower side represents the rear. The light guide plate 528 of the backlight unit 520 may include an incident light surface 5281 on one side, which faces the light assembly 524 and receives light emitted from the light assembly 524.

The light assembly 524 may be positioned at a predetermined distance (approximately 0.5 mm or less) from the incident light surface 5281. If the light assembly 524 is positioned too far from the incident light surface 5281, there is a risk of light loss, and if the light assembly 524 is positioned too close to the incident light surface 5281, there is a problem where the light does not spread evenly.

Additionally, the central part of the incident light surface 5281 in the thickness direction is closer to the light-emitting lamp 5242, and when the light-emitting lamp 5242 operates for a long period, there is a risk that the heat from the light-emitting lamp 5242 may damage the incident light surface 5281.

Additionally, the distance from the light-emitting lamp 5242 may vary depending on the position of the incident light surface 5281 in the thickness direction. If the light is incident obliquely in a direction perpendicular to the incident light surface 5281, some or all of the light may be reflected instead of entering the light guide plate 528 (Fresnel reflection). The light that is reflected without entering the incident light surface 5281 is lost and may lead to a decrease in the brightness and optical efficiency of the backlight unit 520.

Figure 6:
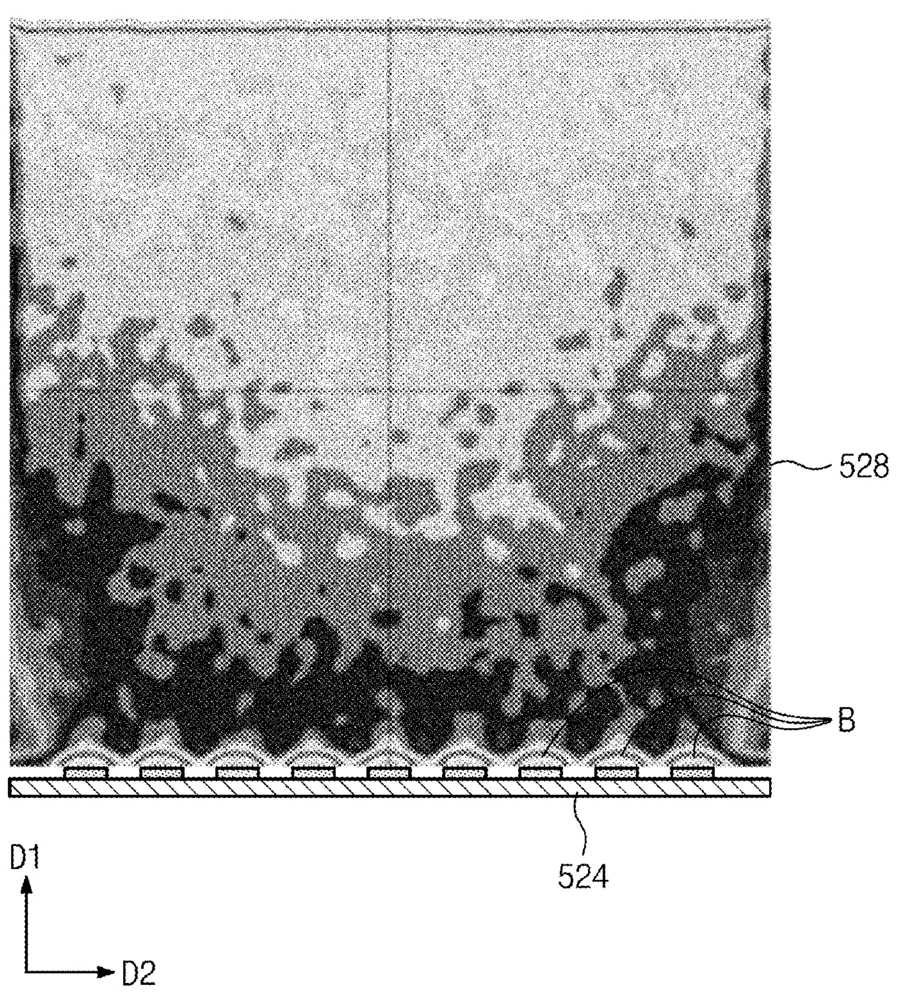
FIG. 6 is a diagram illustrating the amount of light emitted from a light guide plate in the embodiment of FIG. 5 represented by color.

FIG. 6 is a diagram illustrating the amount of light emitted from the light guide plate 528 in the embodiment of FIG. 5. In the length direction of the light assembly 524 (the horizontal direction in FIG. 6, the second direction), the amount of light incident on the light guide plate 528 varies significantly depending on the distance from the light-emitting lamp 5242.

A position B adjacent to the light-emitting lamp 5242 appears bright, and thus the brightness difference between positions becomes significant. Additionally, due to Fresnel reflection, there is insufficient light incident on the light guide plate 528, leading to a brightness difference in the first direction (vertical direction in the drawing) of the light guide plate 528.

Figure 7:
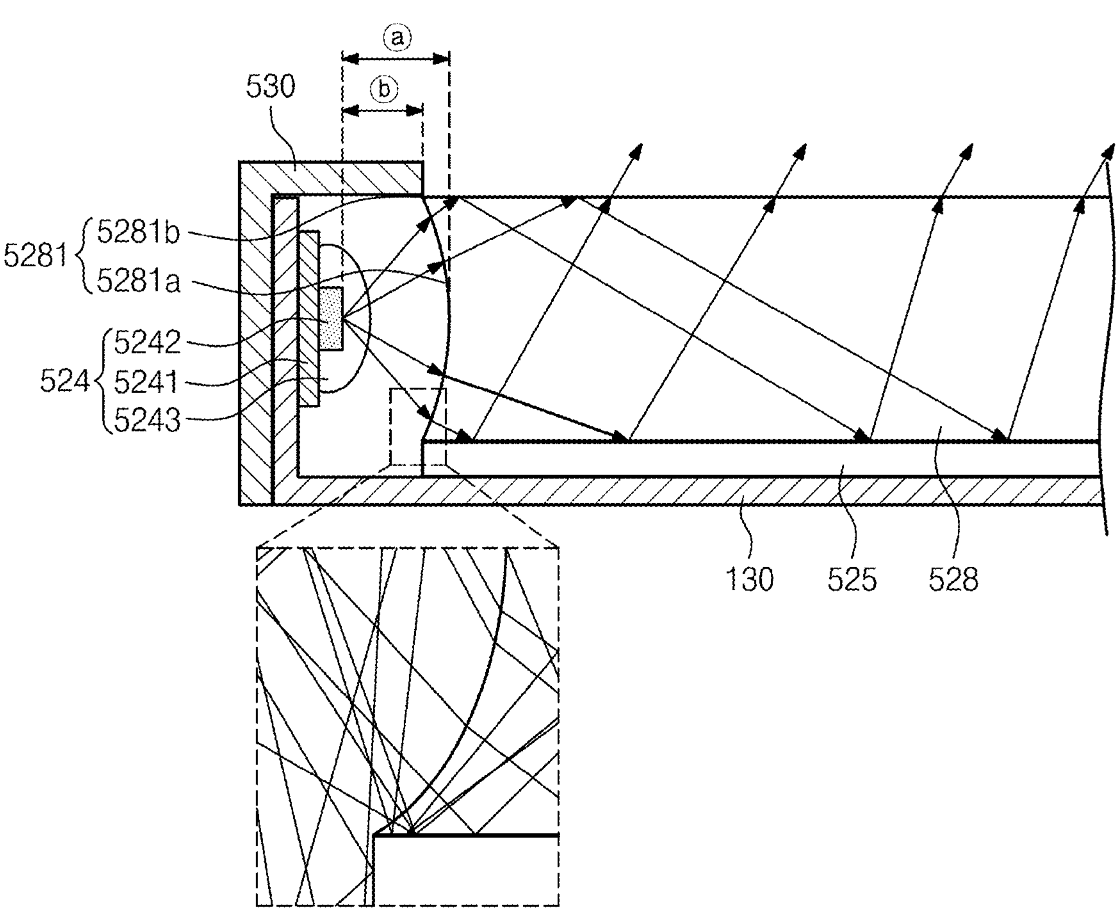
FIG. 7 is a side cross-sectional view of the backlight unit of the display device of the present disclosure.

FIG. 7 is a side cross-sectional view of the backlight unit 520 of the display device 100 of the present disclosure. The backlight unit 520 of the present disclosure may solve the aforementioned problems by forming a curved surface on the incident light surface 5281.

The incident light surface 5281 has the farthest distance from the light-emitting lamp 5242 at the center 5281*a* in the thickness direction. The front and rear ends 5281*b* may include a concave curved surface that protrudes in the direction of the light assembly 524, where the distance from the light-emitting lamp 5242 (distance) is closer.

The incident light surface 5281 may include a curved surface where the angle of incidence of the light incident from the light-emitting lamp 5242 is perpendicular. When light is incident perpendicular to the incident light surface 5281, Fresnel reflection does not occur, thereby reducing light loss.

By analyzing the direction of the light emitted from the light-emitting lamp 5242, the incident light surface 5281 may be implemented to form a right angle of incidence. Alternatively, if a dome-shaped light source lens 5243 covering the light-emitting lamp 5242 is included, the incident light surface 5281 may include a curved surface such that the distance from the light source lens 5243 surface remains constant.

The curved surface of the incident light surface 5281 may be configured as a continuous groove extending along one side of the light guide plate 528. Alternatively, the curved surface of the incident light surface 5281 may be configured in a hemispherical shape centered with respect to the light-emitting lamp 5242 of the light assembly 524.

In the latter case, while there is an advantage in reducing light loss, the amount of light incident on the light guide plate 528 from the hemispherical incident light surface 5281 may decrease, causing uneven light distribution in the direction of the incident light surface 5281.

In the former case, although some of the light from the light-emitting lamp 5242 may be reflected, the incident light surface 5281 has a continuous surface, allowing the light incident on the light guide plate 528 to maintain continuity. In addition, the light guide plate 528 with the continuously curved incident light surface 5281 is easy to manufacture. Therefore, the following description will be based on the incident light surface 5281 in the form of a groove that continuously extends along one side of the light guide plate 528.

A first distance a from the light-emitting lamp 5242 to the center of the incident light surface 5281 is longer than a second distance b from the light-emitting lamp 5242 to the front or rear end of the incident light surface 5281, and the first distance may be between 1.3 and 2.1 times the second distance. If the distance ratio is too small, Fresnel reflection occurs, and there is no improvement in the optical efficiency. If the ratio is too large, the light spreading effect may become excessive.

Figure 8:
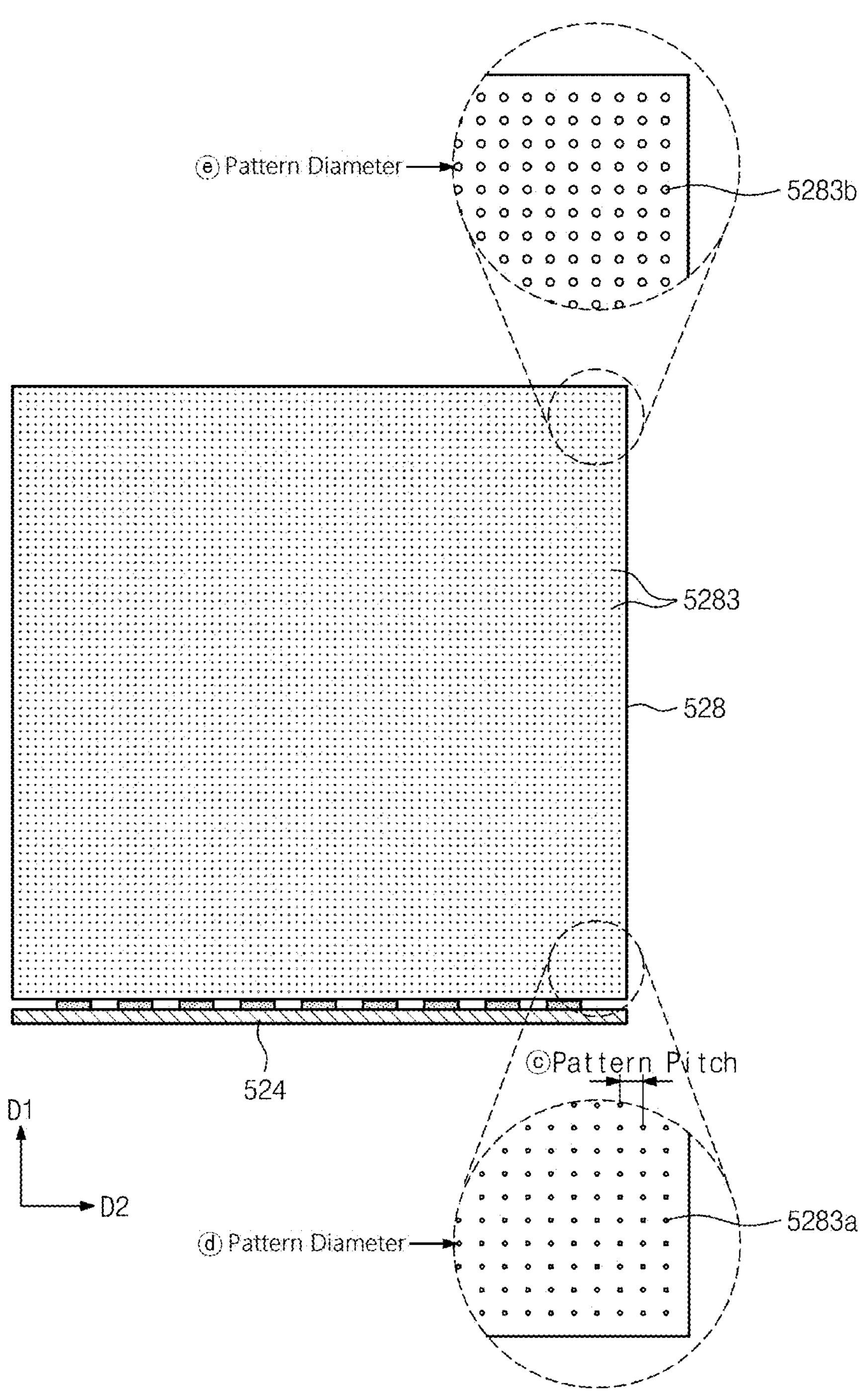
FIG. 8 is a diagram illustrating an uneven pattern on the rear surface of the light guide plate of the display device of the present disclosure.

FIG. 8 is a diagram illustrating the uneven pattern 5283 on the rear surface of the light guide plate 528 of the display device 100 of the present disclosure.

The optical efficiency is improved through the curved surface of the incident light surface 5281. To reduce the proportion of light emitted forward from an area adjacent to the incident light surface 5281, the size of the uneven pattern 5283 in the area adjacent to the incident light surface 5281 (within 10% of the length of the light guide plate 528) may be reduced.

Protrusions 5283*a* and 5283*b* of the uneven pattern 5283 may be arranged in an irregular pattern. Alternatively, multiple protrusions 5283*a* and 5283*b* may be arranged in a grid pattern as shown in FIG. 8.

The uneven pattern 5283 of the present disclosure is composed of multiple protrusions 5283*a* and 5283*b* arranged in a grid pattern, and by adjusting the size of the protrusions 5283*a* and 5283*b*, the area occupied by the multiple protrusions (the density of the protrusions) may be varied.

The diameter of the first protrusion 5283*a*, which is located within 10% of the first direction length (vertical length in the drawing) of the light guide plate 528 on one side where the incident light surface 5281 is positioned, may be less than or equal to 0.5 times the spacing (pitch) to the adjacent protrusion 5283 *a*.

If the diameter of the first protrusion 5283*a* is too small, the protrusion height of the first protrusion 5283*a* may also be small, leading to a decrease in the amount of light emitted forward. Therefore, the diameter of the first protrusion 5283*a* may be configured to be at least 0.15 times the spacing between the protrusions 5283*a*.

The size of the first protrusion 5283*a* adjacent to one side of the light guide plate 528 may be less than or equal to half (½) of the size of the second protrusion 5283*b* adjacent to the other side.

Figure 9:
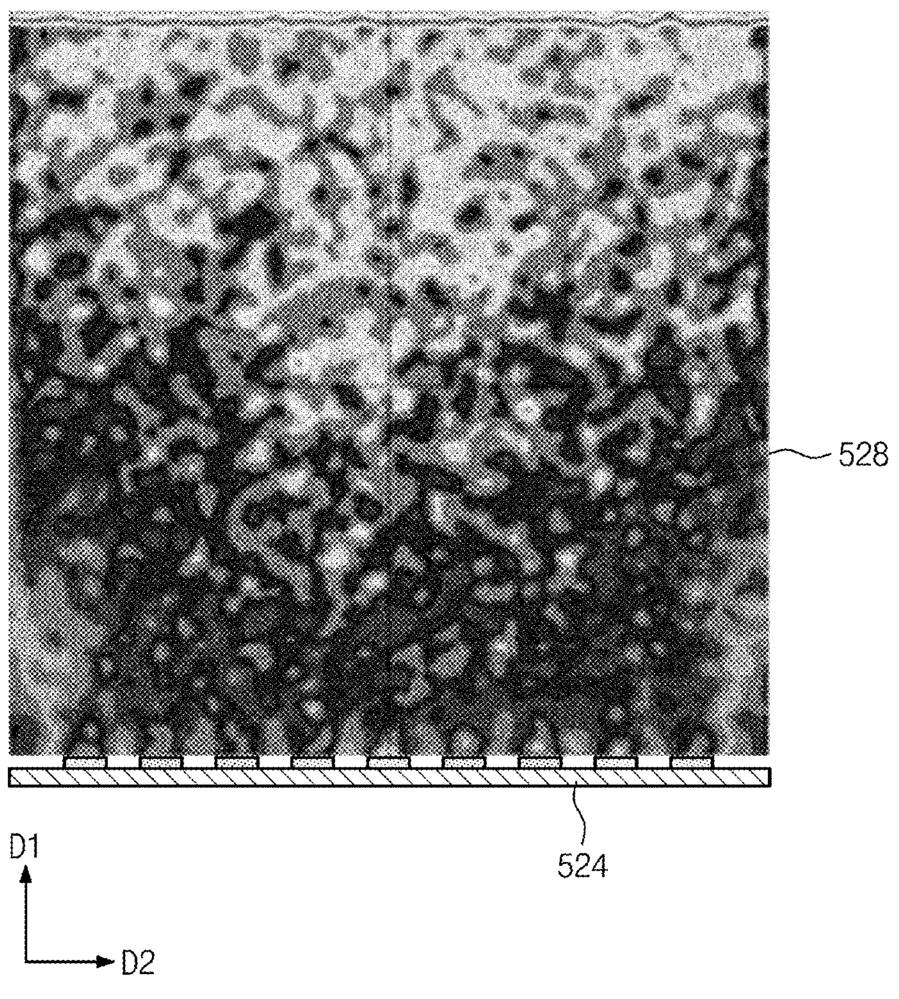
FIG. 9 is a diagram illustrating the amount of light emitted from the light guide plate in the embodiment of FIG. 7 represented by color.

FIG. 9 is a diagram illustrating the amount of light emitted from the light guide plate 528 according to the embodiment of FIG. 7 represented by color. The brightness of the light guide plate 528 is increased by the light-emitting lamp 5242 of the conventional backlight unit 520. According to the present disclosure, the brightness on one side of the light guide plate 528 appears uniform, and the brightness in the first direction D1 of the light guide plate 528 is also uniformly distributed across the entire area. As described above, the backlight unit 520 of the present disclosure may improve the reliability of the light guide plate 528 by increasing the distance between the light source and the incident light surface 5281 of the light guide plate 528.

Specifically, Fresnel reflection may be prevented at the incident light surface 5281 of the light guide plate 528, thereby improving the optical efficiency.

The above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A backlight unit comprising:

a light assembly;

a light guide plate comprising an incident light surface facing the light assembly on a side surface and an emission surface located on a front surface;

an optical sheet configured to uniformly emit light emitted from the light guide plate toward a front side; and a reflective sheet located on a rear surface of the light guide plate, wherein a center of the incident light surface is spaced by a first distance from the light assembly in a thickness direction of the incident light surface, wherein front and rear ends of the incident light surface are spaced by a second distance from the light assembly, wherein the incident light surface has a curved surface where the first distance is longer than the second distance, and wherein the first distance is between 1.3 times and 2.1 times the second distance.

2. The backlight unit of claim 1, wherein the incident light surface comprises a curved surface perpendicular to the light emitted from the light assembly.

3. The backlight unit of claim 1, further comprising an uneven pattern comprising multiple protrusions formed on the rear surface of the light guide plate, wherein diameters of the protrusions increase as the protrusions are spaced farther from the light assembly.

4. The backlight unit of claim 3, wherein a diameter of a protrusion adjacent to the light assembly is smaller than or equal to half a spacing to an adjacent protrusion.

5. A display device comprising:

a display panel; and a backlight unit located on a rear surface of the display panel and configured to supply light to the display panel, wherein the backlight unit comprises:

a light assembly;

a light guide plate comprising an incident light surface facing the light assembly on a side surface and an emission surface located on a front surface;

an optical sheet configured to uniformly emit light emitted from the light guide plate toward a front side; and a reflective sheet located on a rear surface of the light guide plate, wherein a center of the incident light surface is spaced by a first distance from the light assembly in a thickness direction of the incident light surface, wherein front and rear ends of the incident light surface are spaced by a second distance from the light assembly, wherein the incident light surface has a curved surface where the first distance is longer than the second distance, and wherein the first distance is between 1.3 times and 2.1 times the second distance.

6. The display device of claim 5, further comprising an uneven pattern comprising multiple protrusions formed on the rear surface of the light guide plate, wherein diameters of the protrusions increase as the protrusions are spaced farther from the light assembly.

* * * * *